United States Patent [19]
Drake

[11] Patent Number: 6,006,328
[45] Date of Patent: Dec. 21, 1999

[54] COMPUTER SOFTWARE AUTHENTICATION, PROTECTION, AND SECURITY SYSTEM

[75] Inventor: Christopher Nathan Drake, North Sydney, Australia

[73] Assignee: Christopher N. Drake, United Kingdom

[21] Appl. No.: 08/679,077

[22] Filed: Jul. 12, 1996

Related U.S. Application Data

[63] Continuation of application No. 08/679,077, Jul. 12, 1996.

[30] Foreign Application Priority Data

| Jul. 14, 1995 | [AU] | Australia | PN4186 |
| May 15, 1996 | [AU] | Australia | PN9866 |

[51] Int. Cl.$^6$ .................................................. G06F 12/14
[52] U.S. Cl. ............................................................. 713/200
[58] Field of Search ............................... 395/186, 188.01;
364/222.5, 286.4, 286.5; 380/3, 4, 23, 59;
713/200, 202

[56] References Cited

U.S. PATENT DOCUMENTS

| 4,918,653 | 4/1990 | Johri et al. ................................ 364/900 |
| 4,945,468 | 7/1990 | Carson et al. ........................... 364/200 |
| 5,343,527 | 8/1994 | Moore ......................................... 380/4 |
| 5,488,664 | 1/1996 | Shamir ...................................... 380/54 |
| 5,521,722 | 5/1996 | Colvill et al. ........................... 358/500 |
| 5,530,752 | 6/1996 | Rubin ......................................... 380/4 |
| 5,590,199 | 12/1996 | Krajewski, Jr. et al. ................. 380/25 |
| 5,606,609 | 2/1997 | Houser et al. ............................. 380/4 |
| 5,613,012 | 3/1997 | Hoffman et al. ......................... 382/115 |
| 5,664,099 | 9/1997 | Ozzie et al. ............................. 395/186 |

*Primary Examiner*—Robert W. Beausoliel, Jr.
*Assistant Examiner*—Stephen C. Elmore
*Attorney, Agent, or Firm*—Philip H. Albert; Kim Kanzake, Ph.D.; Townsend and Townsend and Crew, LLP

[57] ABSTRACT

A software-based computer security enhancing process and graphical software-authenticity method, and a method to apply aspects of the two are disclosed. The process provides protection against certain attacks on executable software by persons or other software used on the computer. Software using this process is protected against eavesdropping (the monitoring of software, applications, the operating system, disks, keyboard, or other devices to record (steal) identification, authentication or sensitive data such as passwords, User-ID's, credit-card numbers and expiry dates, bank account and PIN numbers, smart-card data, biometric information (for example: the data comprising a retina or fingerprint scan), or encryption keys), local and remote tampering (altering software to remove, disable, or compromise security features of the altered software) examination (viewing the executable program, usually with the intent of devising security attacks upon it), tracing (observing the operating of an executable program step-by-step), and spoofing (substituting counterfeit software to emulate the interface of authentic software in order to subvert security) by rogues (eg: Trojan Horses, Hackers, Viruses, Terminate-and-stay-resident programs, co-resident software, multi-threaded operating system processes, Worms, Spoof programs, key-press password capturers, macro recorders, sniffers, and other software or subversions). Aspects include executable encryption, obfuscation, anti-tracing, anti-tamper & self-verification, runtime self-monitoring, and audiovisual authentication (math, encryption, and graphics based method permitting users to immediately recognise the authenticity and integrity of software). FIG. 5 in the specification depicts the many components and their interaction.

21 Claims, 6 Drawing Sheets

EXE FILE HEADER

| ADDRESS | CONTENTS | TYPE |
|---|---|---|
| 00H | EXE PROGRAM IDENTIFIER (5A4DH) | 1 WORD |
| 02H | FILE LENGTH MOD 512 | 1 WORD |
| 04H | FILE LENGTH DIV 512 | 1 WORD |
| 06H | NUMBER OF SEGMENT ADDRESS FOR PASSING | 1 WORD |
| 08H | HEADER SIZE IN PARAGRAPHS | 1 WORD |
| 0AH | MINIMUM NUMBER OF PARAGRAPHS NEEDED | 1 WORD |
| 0CH | MINIMUM NUMBER OF PARAGRAPHS NEEDED | 1 WORD |
| 0EH | STACK SEGMENT DISPLACEMENT | 1 WORD |
| 10H | SP REGISTER CONTENTS WHEN PROGRAM STARTS | 1 WORD |
| 12H | CHECKSUM BASED ON EXE FILE HEADER | 1 WORD |
| 14H | IP REGISTER CONTENTS WHEN PROGRAM STARTS | 1 WORD — 81 |
| 16H | START OF CODE SEGMENT IN EXE FILE | 1 WORD — 81 |
| 18H | RELOCATION TABLE ADDRESS IN EXE FILE | 1 WORD — 82 |
| 1AH | OVERLAY NUMBER | 1 WORD |
| 1CH | BUFFER MEMORY | 1 WORD |
| xxH | ADDRESS OF PASSING SEGMENT ADDRESSES (RELOCATION TABLE) | xx |
| xxH | PROGRAM CODE, DATA, AND STACK SEGMENT | xx |

COMPUTER SOFTWARE AUTHENTICATION, PROTECTION, AND SECURITY SYSTEM

This is a continuation of application Ser. No. 08/679,077, filed Jul. 12, 1996.

BACKGROUND OF THE INVENTION

The present invention relates to a computer program having enhanced security features, and also to a system and method for enhancing the security features of a computer program. In particular, the present invention relates to such a program, and the system and method for creating the program, having increased security features to prevent ID data (as defined) eavesdropping and/or theft and/or ensure authenticity.

Description of the Prior Art

Computers are becoming widely interconnected and heavily relied upon to process and store sensitive information. The risk of unauthorised access to computers and information has increased with this increased interconnectivity.

Many security advances exist in the areas of identification & authentication of users, cryptography, virus prevention, and the like, however—almost all of these advances ultimately rely upon computer software. Most computer systems are, or are accessed by, small personal computers, and most software used on these personal computers is susceptible to "local attacks"—attacks which are mounted from inside said personal computers against said software by other software or people.

Passwords, User-ID's, credit-card numbers and expiry dates, bank account and PIN numbers, smart-card data, biometric information (for example: the data comprising a retina or fingerprint scan), cryptographic keys, and the like, are all examples of identification, authentication or similar data which is either sensitive in itself, or may allow access to sensitive, restricted or other information or services. Hereafter, the term ID-Date will be used to refer to the abovementioned identification, authentication or similar data, excluding ID-Data which is valid only for a single use, or which is designed to expire at regular intervals of short periods of time, say less than two minutes.

Illegal access to computer system information can be obtained by exploiting various security flaws found in computer software products. A common flaw is the susceptibility of said software to the theft of ID-Data either directly from said software as it executes, or, from the operating system or hardware on which said software is executing. Another common flaw is the susceptibility of said software to (illegal) modification. Such modifications may remove, disable, or compromise the security features of said software.

Viruses, Terminate-and stay-resident programs (TSRs), co-resident software, multi-threaded operating system processes, Trojan Horses, Worms, Hackers, Spoof programs, keypress password capturers, macro-recorders, sniffers, and the like can be effective at stealing ID-Data and are examples of (a) rogue software, (b) people capable of subverting security software, or, (c) software which can be configured for illegimate purposes. Hereafter, the term rogue software will be used to refer to software or subversions such as the above mentioned (a) (b) and (c), used for the purpose of stealing ID-Data. The definition of our term "rogue software" when used herein also includes software or other means used to tamper with other software. The term tampering is defined hereafter.

There are many ways to introduce rogue software into a computer system. Viruses spread automatically by introducing themselves. Trojan-Horses are usually introduced by tricking users into allowing them to execute (such as by masquerading as a new or well-known computer game or other product). Existing security problems may be utilised to introduce rogue software, some well known problems include lava bugs, errors, or oversights, ineffective physical security (for example: permitting rogue software to be introduced directly on floppy disk by an intruder); electronic mail attachments which automatically execute or execute after a simple mouse-click, incorrect security settings on internet, world-wide-web, TCP/IP or modems, and tampering (see definition hereafter) with legitimate software in-transit as it flows from remote internet sites into a users computer, to name a few.

Rogue software, once introduced, can steal ID-Data as mentioned hereinbefore. It may monitor keyboard (for example: by recording every key, as the user presses each one, in order to steal a password as it is being typed in), serial-port, mouse, screen, or other devices to steal ID-Data directly from them. It may monitor other software, applications, the operating system, or disks to steal ID-Data from there also. Once stolen, this ID-Data may be stored locally (for example: in memory or on-disk) or transmitted to remote locations (for example: by modem or network) or used immediately to perform illegal operations. Hereafter, the term eavesdropping will be used to refer to the monitoring of a computer to record ID-Data.

For example, a key press recorder could secretly, and unbeknown to the computer user, record all the keys pressed by the user into a hidden systems file. The information recorded could include a user's password and other sensitive information which an organisation would obviously wish to protect.

Additionally, rogue software may remove, disable, or compromise existing computer software security features by modifying the memory, disk or other image of said computer software. Rogue software may also utilise tampering techniques to alter existing computer software in order to steal ID-Data from it, or may attach itself to existing computer software (as is the case with many computer viruses). Hereafter, the term tampering will be used to refer to the abovementioned modification of computer software. Tampering may take place either locally (within a users PC) or remotely (for example: at one of the points which a computer program passes through as it is being download).

Further, counterfeit software can be substituted for legitimate software. The counterfeit will appear real to a computer user, but actually acts to subvert security, such as by stealing ID-Data. Sometimes called "Spoof" programs or Trojan Horses, counterfeit software of this type may invoke the original legitimate software after having stolen ID-Data, so as not to arouse a user's suspicion.

Another potential security flaw found in computer software products is susceptibility to examination and reverse-engineering. Known (but generally secret) and other security problems or mistakes can be discovered by hackers and the like from the examination of existing computer software and by tracing its operation.

Additionally, Computer software piracy is a growing problem, and the existing simple means which prevent this problem (such as registration or serial numbers and customer-names being encoded within the product) are becoming less effective.

There is necessity within the try-before-you-buy software market for vendors to employ effective features which allow old software to expire without fear of hackers or the like removing said expiry features and for secure registration of software to be provided through the use of software unlock-codes.

There is also need for software to be able to prevent security attacks upon itself (ie: tampering) and upon its own attack-detection code. There may also be a future need for software to identify the attacker for subsequent prosecution.

There also exists cases where untamperable software usage metering may be desirable, and where effective password-protection of software execution may also be desirable.

Known advances in certain areas of computer security have been successful and documented. There have been some advances in anti-virus technology which help detect and prevent certain security problems. There have been numerous advances in hardware-assisted computer security add-ons and devices, such as smartcards and biometric input devices. There have been advances in cryptographic techniques. Generally, all of these advances require authentic, un-tampered-with computer software in order to work. There have been relatively few advances in software based integrity self-checking (eg: tamper protection), and no prior software-based advances in preventing eavesdropping or the electronic theft of ID-Data, and no prior software-based advances in self-authentication.

SUMMARY OF THE INVENTION

This invention seeks to provide computer software having enhanced security features, to a process which substantially enhances the security of computer software (hereafter referred to as the improved process) and to a method by which to apply said improved process (hereafter referred to as the applicator).

The improved process consists of including computer code to automatically detect tampering of said computer software, and computer code to prevent the theft of ID-Data by replacing existing vulnerable (to rogue software eavesdropping or attack) software or operating system code with secure equivalents which utilise anti-spy techniques (as described later in this document).

Preferably, the improved process also consists of including computer code to prevent decompilation, reverse-engineering, and disassembly by the inclusion of obfuscating code inserts, and the use of executable encryption.

Preferably, the improved process also consists of including code to prevent execution-tracing and debugging by the use of code designed to detect and prevent these operations.

Preferably, the improved process consists of, or also includes, human-recognisable audio-visual components which permit the authenticity of said computer software to be easily verified by the user on each invocation using techniques described later in this document.

The idea which lead to the creation of this invention can be summarised as follows: If a piece of computer software that is executing can be shown to be the genuine article, and this software can protect itself against eavesdropping, and this software can prevent tampering of itself, then is it possible for this software to function in a secure manner, even within an insecure operating system. This invention permits the creation of such a piece of computer software— having a tangible, useful security advantage and hence improving its value.

BRIEF DESCRIPTION OF THE DRAWINGS

The present invention will become more fully understood from the following detailed description of preferred but non-limiting embodiments thereof, described in connection with the accompanying drawings, wherein.

DETAILED DESCRIPTION OF PREFERRED EMBODIMENTS

Throughout the drawings, like numerals will be used to identify similar features, except where expressly otherwise indicated.

As will be described hereinafter, the present invention has general applicability to many different operating systems including MICROSOFT DOS™ (Microsoft Disk Operating System) APPLE MACINTOSH OPERATING SYSTEM, UNIX™, etc.

Detailed hereafter are several security-enhancing techniques to combat eavesdropping. Security is provided by (a) hampering examination of software-code operating system code or or parts thereof through the use of the encryption or partial encryption of said code, (b) preventing the disassembly of said code through the inclusion of dummy instructions and prefixes and additional code to mislead and hamper disassembly (ie: obfuscating inserts), (c) preventing the computerised tracing of the execution of said code (for example: with code debugging tools) through the use of instructions to detect, mislead, and hamper tracing, (d) preventing tampering of said code through the use of scanning to locate alterations, either or both on-disk and in memory either once at the start of execution, or continuously upon certain events, or (e) preventing ID-Data theft through the inclusion of secure input/output routines (for example: routines to bypass the standard operating system keyboard calls and use custom-written higher-security routines as a replacement) to replace insecure computer-system routines. Hereafter, the term anti-spy will be used to refer to any combination of one or more of the abovementioned techniques [(a) through (e) or parts thereof] used to prevent eavesdropping.

Figure 1:
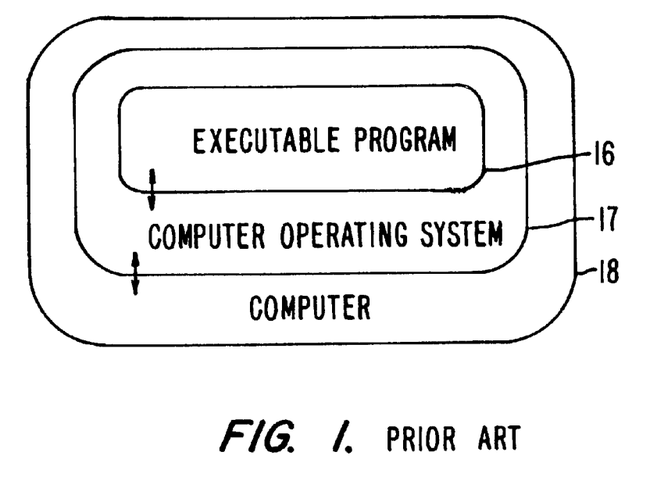
FIG. 1 illustrates the standard operation of a computer system known in the prior art.

Referring now to FIG. 1 there is illustrated the standard scenario for "running" a given executable program 16, under the control of a computer operating system 17 on a computer 18. In the preferred embodiment of the present invention, the executable program 16 is subjected to modification, as will be described hereinafter, to ensure its integrity and improve its security. There are five aspects of this inventions improved process, although said provess is still substantially improved even if not all of them are present. These aspects are: (1) Preventing eavesdropping (2) preventing disassembly and examination (3) detecting tampering (4) preventing execution-tracing and (5) ensuring authenticity.

Preferred embodiments illustrates each of these aspects of the present invention will now be described.

Aspect 1. Preventing Eavesdropping

As hereinbefore described, it is desirable to prevent rogue software from eavesdropping on ID-Date. By replacing software which is vulnerable to eavesdropping with equivalent software which is far more secure, this purpose is achieved. To remove the vulnerability from the secure equivalent software, replacement routines may communicate directly with the hardware of the computer (for example, they may communicate with the keyboard circuitry instead of using the system-supplied (and hence possibly insecure) application interface keyboard-entry function-calls.) while disabling system interrupts which would permit rogue software to eavesdrop. Said replacement routines are coded to store ID-Data retrieved in a secure manner. ID-Data is not stored in full in plaintext (ie: unencrypted) in system or application buffers.

Aspect 2. Preventing Disassembly and Examination

As hereinbefore described, it is desirable to hamper disassembly (or de-compilation or reverse engineering) to protect software against eavesdropping and tampering, and to hinder examination of said software which might lead to secret security problems or mistakes being disclosed.

Obfuscating inserts can successfully prevent automatic disassembly. Obfuscation is achieved by following unconditional jump instructions (for example, Intel JMP or CLC/JNC combination or CALL (without a return expected) or any flow-of-control altering instruction (which is known not to return to the usual place) with one or more dummy op-code bytes which will cause subsequent op-codes to be erroneously disassembled (for example, the Intel 0xEA prefix will cause disassembly of the subsequent 4 op-codes to be incorrect, displaying them as the offset to the JMP instruction indicated by the 0xEA prefix instead of the instructions they actually represent).

Dummy instructions may also be included to hamper disassembly by deliberately misleading a disassembler into believing a particular flow of control will occur, when in fact it will not.

Flow of control can be designed to occur based upon CPU flag values determined from instructions executed a long time ago. Together with tracing preventing, this makes manual disassembly nearly impossible.

The majority of the executable portions of the software can be encrypted for external storage. The decryption taking place in-memory after the software is loaded from external sources, under the control of a decryption "header" which prevents its own tampering and disassembly etc. This makes manual and automatic disassembly nearly impossible, since the decryption should be designed to fail if tampering or tracing is detected.

Aspect 3. Detecting Tampering

As hereinbefore described, it is desirable to detect tampering, since this may lead to the reduction of software security.

This can be achieved with the use of code which is protected from disassembly and examination through obfuscation and encryption, which re-reads its own external-image and compares it with its known memory image or precalculated check-data to detect hot-patching (ie. the modification of software sometime after it has been loaded from disk, but (usually) before execution of the modified section has commenced).

Additionally, the software can scan the memory image of itself one or more times, or continuously, to ensure that unexpected alterations do not occur.

Certain modifications to the external copy of software are reflected in subtle changes to the environment in which the modified software will be executed (for example: the size of the code, if altered, will be reflected in the initial code size value supplied to the executing program being incorrect.). Additionally, certain modification to the operating system and environment of said software can also be monitored (for example: certain interrupt vector table pointers in Intel-processor applications) to detect unexpected changes by rogue software. These changes can also be detected to prevent tampering.

Once tampering is detected, program flow-of-control needs to be changed so that the potential compromise associated with ID-Data theft is avoided. This may be the security-enhanced program terminating with a message indicating that its integrity has been compromised before all of the ID Data is entered. Alternatively, the fact that tampering has been detected may be kept secret and the ID-Data retrieved, however, immediately upon retrieval, the ID-Data entered can be invalidated thus preventing access to that which the now potentially compromised ID-Data would have otherwise allowed. This latter method allows for the possibility of security-enhanced software informing remote or other authorities that tampering was detected and possibly other information, such as what specifically was altered and by whom. Care must be taken to ensure the integrity of the "remote-informing" code before ID-Data entry is permitted.

Aspect 4 Preventing Execution-Tracing

Apart from "spoofing" (described in aspect 5 hereafter) the last resort of a rogue who is prevented from disassembly, tampering, and eavesdropping on software is to trace the execution of said software in order to facilitate the compromise of its security. Hampering tracing (tracing, is sometimes called debugging) prevents this.

There are numerous methods of detecting a debug-environment (ie: when tracing is taking place). When combined with decryption and tamper-protection as hereinbefore described, it makes the rogues task of detecting and bypassing debug-detection extremely difficult. Reference and examples to Intel and MS-DOS environments follow hereafter, although it will be apparent to one skilled in the art that these and similar methods are applicable on other platforms.

Standard Intel x86 interrupts 1 and 3 are used by debuggers to facilitate code tracing. By utilising these interrupts (which are not normally used by normal applications) in security-enhanced software, it hampers debugging, since built-in debugging functions are now not automatically available.

Monitoring the system timer to determine if software execution has spent too long accomplishing certain tasks can detect a situation where code tracing has been in effect and a breakpoint was reached.

Disabling the keyboard will hamper debuggers, since tracing instructions are usually issued from the keyboard. Similarly, disabling other places from where tracing instructions are usually issued (eg: serial ports, printer ports, and mouse) or displayed (eg: screen) will also hamper tracing.

System interrupts can be re-vectored for use within the secure software to perform tasks not usually performed by those interrupts. Debuggers usually rely upon system interrupts also, so to do this would usually disable or destroy a debugger being used to trace the software. Disabling interrupts and performing timing-sensitive instructions between them will further hamper debugging. When tracing software, instructions are usually executed one-at-a-time in order for the user to understand their operation. Many system interrupts must occur regularly (eg: timer and memory re-fresh operations), so debuggers usually do not disable interrupts even when they encounter an interrupt-disabling instruction. If timers and the like are re-vectored in two separate stages, any timer (etc) interrupt occurring in between the two stages will fail, and usually crash the computer. Further, interrupts can be disabled or enabled using obscure means (with flag-altering instructions for example) to hamper tracing.

Discretely testing the status of disabled or enabled system facilities (eg. interrupts, keyboard, vector-pointers) to ensure that a debug environment has not altered or by-passed them will seriously hamper tracing also.

Certain computer processors have instruction caches. In some circumstances, it is possible to alter the instructions immediately before the CPU encounters them, but the altered instruction will not be executed normally because the cache copy has the "old" one still. In debug environments, the cache is usually flushed, so any altered instructions will actually be executed. This again hampers tracing.

Using strong cryptographic schemes such as DES "(Data Encryption Standard)", or RSA "(RIVEST, SHAMIR, ADELMAN, Algorithm) " or the like will present the examination of any decryption routines from revealing a simple patch to disable said routines. When tracing software, the program stack is usually used by the debugger either during the tracing operations or at other times. This is easily detected, and by using the area of the stack which will be destroyed by unexpected stack-use for code or critical data, software can be designed to self-destruct in this situation.

Scanning the command environment and the execution instruction can detect the execution of software by unusual means. Searching for "DEBUG" in the command line, or scanning memory for known debuggers for example will detect tracing. Additional, by detecting which operating system process initiated the load of the software, unexpected processes (eg: debuggers) can be detected.

Monitoring system buffers (eg: the key board memory buffer) or hardware (eg: the keyboard circuitry and internal buffers) for unexpected use (eg: keyboard input and processing is occurring when the software is not requesting it) will also detect debuggers, which usually rely in part on system functions in order to operate.

Building a process or multiple processes which are traditionally difficult to trace, such as a resident or child process which executes during system interrupts or after the parent process has terminated will again hamper tracing.

Bypassing system routines (eg: in DOS, using direct memory writes instead of DOS system calls to revector interrupts) will further hamper debugging and rogue software monitoring, as will unravelling loop constructs (which will make tracing long and cumbersome). Code checksums and operating-system checks (eg: interrupt table pointers) can be designed to detect debug-breakpoint instruction inserts or other modifications. Using the result of the checksum for some obscure purpose (eg: decryption, or (much later) control-flow changes) will further hamper tracing.

It will be apparent to one skilled in the art of low-level software programming that a combination of techniques to detect, prevent, and mislead tracing will provide a mechanism making tracing very difficult, if not impossible. At the very least, it will require an expert with very expensive tools and perhaps some understanding of the original software design a very long time to make any debugging progress—a situation which is recognised in military software security accrediation worldwide as highly desirable.

Aspect 5 Ensuring Authenticity

In accordance with an aspect of the present invention there is provided a method of providing for a secure entry of ID-Data in a computer system comprising activating a visual display or animation and/or audio feedback (hereinafter called an audio/visual component) as part of said secure entry of ID-Data so as to hamper emulation of said secure entry process. Preferably, the animation includes feedback portions as part of the ID-Data entry process. Preferably, the animation is repeatable and varied in accordance with the information entered. The animation preferably comprises 2.5D or 3D animation and includes animation of any ID-Data input.

Preferably, the animation is designed to tax the computer resources utilised and thereby making any forgery thereof more difficult.

It will be apparent to one skilled in the art of low-level software programming that the five aspects described herein may be combined to provide substantially stronger security than any aspect taken on its own. For instance, to combine tamper-detection with encryption, the precalculated checkdata as derived during tamper-detection described hereinbefore may actually be one part of the decryption-key which is required to successfully decrypt the remaining executable software. If prevention-of-tracing and environment characteristics (including debugger detection as described hereafter) are additional portions of said decryption-key, it makes the determination of said decryption-key by any person or computer program other than the secure original an extremely difficult, if not impossible, task.

Further, it will also be apparent to one skilled in the art of low-level software programming that a simple construct such as a JNE to alter program flow-of-control after tampering has been detected is insufficient, since the JNE construct itself is subject to tampering. The decryption process described hereinbefore is preferable since there is no single point of alternation that can possibly yield a tampered executable that would execute. Indeed, the executable protected with encryption will not even be transformed into its intended form if tampering is detected.

GENERAL DESCRIPTION OF PREFERRED EMBODIMENT(S)

Notwithstanding any other forms which may fall within the scope of the present invention, preferred forms of the invention will now be described, by way of example only, with references to the accompanying drawings.

Figure 2:
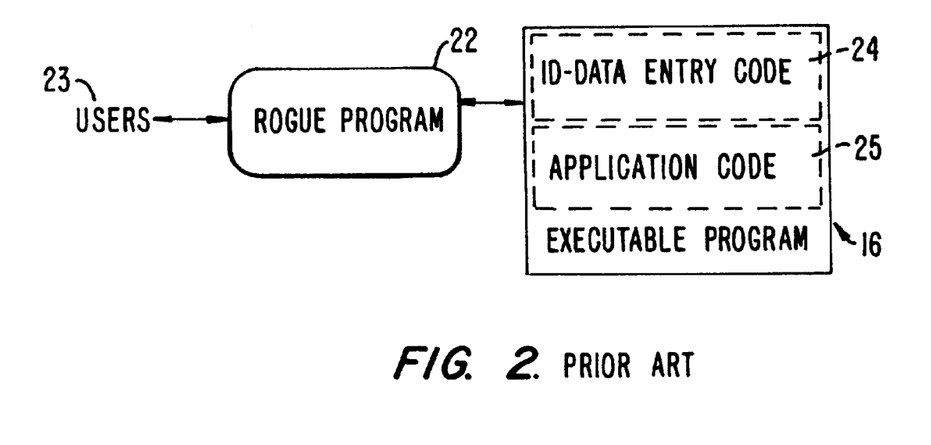
FIG. 2 illustrates the known operation of a rogue or "spoof" program.

In the preferred embodiment of the present invention the user interface for the acquiring of ID-Data is secured whereby the duplication of the interface is rendered mathematically complex such that cipher-code breaking techniques are required to produce a counterfeit look-alike interface. By making the authentication interface (ie: ID-Data entry screen—for example: a logon screen or a screen for entering credit card details) unable to be emulated, tampered with, or reversed engineered, the application program allows for a higher degree of security and authenticity even in insecure environments such as the Internet or home software applications. Referring now to FIG. 2, there is illustrated a classic form of rogue attack on a computer system. In this form of rogue attack, a rogue's "spoof" program 22 is inserted between application software 16 and the user 23. The application 16 normally has a portion 24 devoted to ID-Data entry and verification or the entry of commercially sensitive information (including passwords etc) to the application in addition to the application code 25. The spoof program 22 is designed to exactly reflect the presented user interface of ID-Data entry code 24 to the user. The user 23 is then fooled into utilising the masquerading spoof program 22 as if it was the application 16. Hence the user can be tricked into divulging secret information to the spoof program 22. An example may include a classic "login spoof" wherein the spoof program 22 prints the login prompt (ie: ID-Data entry) message on the screen and the user mistakes the login prompt for a legitimate one, supplying a user name and password to this program 22 which records this information as well as passing it on to the login code 24 of application 15 so as not to arouse the suspicion of user 23—or by issuing a message, such as "incorrect password, please try again" and then passing control to the login code 24 of application 16.

Figure 4:
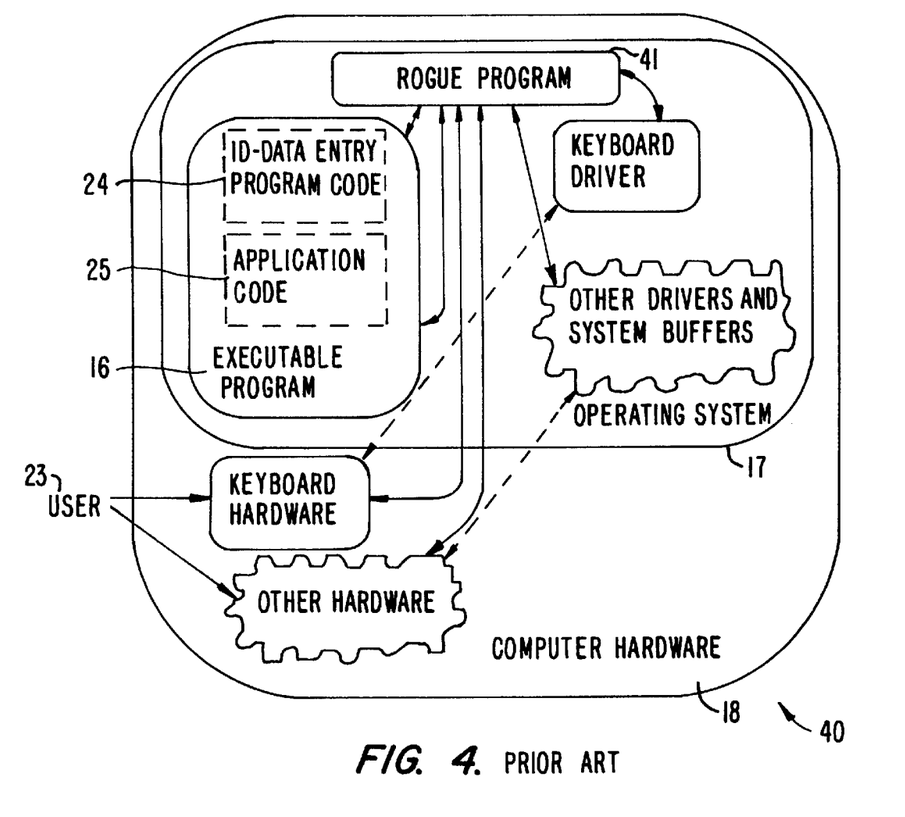
FIG. 4 illustrates the known operation of a rogue eavesdropping program.

Referring now to FIG. 4, there is illustrated a relatively new form of rogue attack 40. This form of attach proceeds similarity to the spoof attack of FIG. 2, with the following difference. Instead of a spoof program 22, a rogue program 41 is inserted which secretly eavesdrops on ID-Data entry code 24, or on application code 25, or on operating system 17, or on hardware 18 or elsewhere in order to steal sensitive information directly from the legitimate application. Since the legitimate application is still actually executing, the users suspicion is not aroused, since rogue program 41 is generally invisible to the user 23. Alternatively, executable program 16 may have been tampered with (as hereinbefore described) to reduce its security, alleviating the necessity for the presence of rogue program 41.

Figure 5:
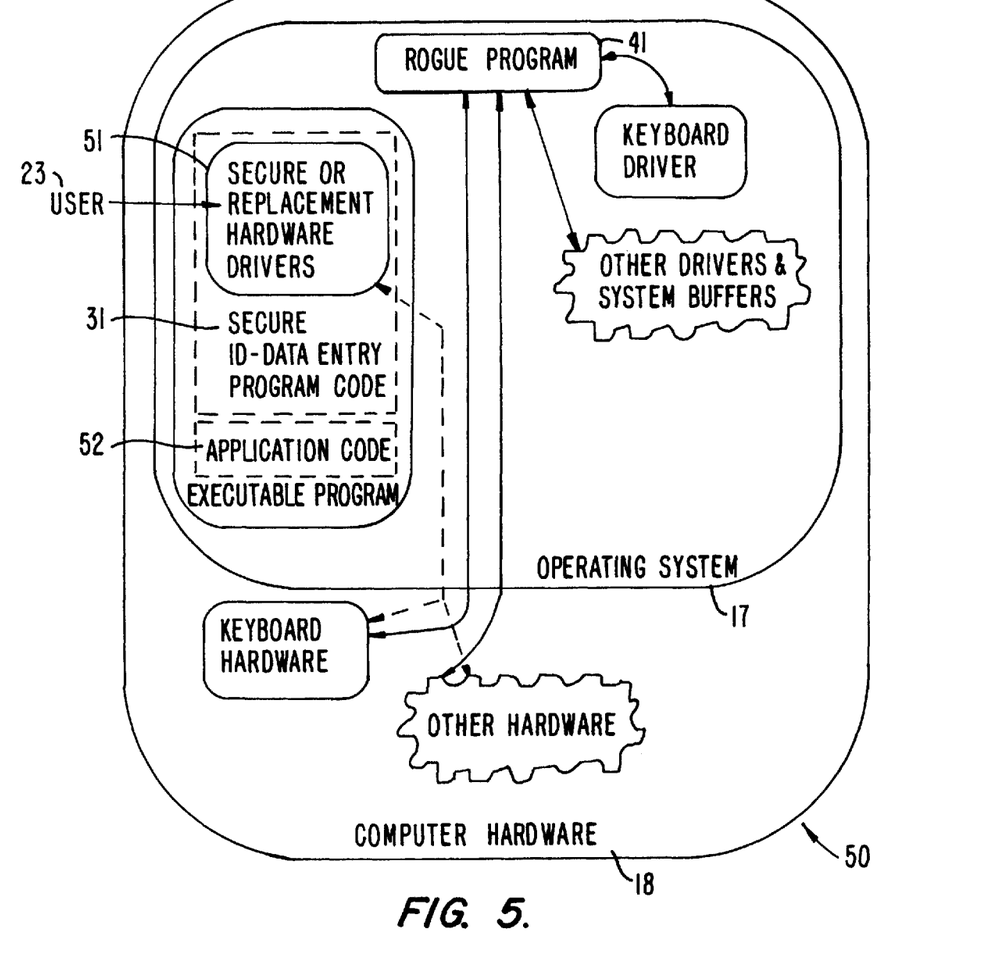
FIG. 5 illustrates the interaction of the components of the updated application.

In FIG. 5, there is illustrated in detail the structure of an application 50 constructed in accordance with the preferred embodiment running on computer hardware 18. FIG. 5 is similar to FIG. 4 with the important difference that user 23 now communicates directly with secure drivers 51 which are part of the secure ID-Data entry program code 31 which is utilised by the security-enhance (eg. tamper protected) application code 52. It can be seen that the user 23 no longer communicates with the operating system 17 or the unprotected computer hardware 18, thus the rogue program 41 can no longer eavesdrop on ID-Data.

Figure 3:
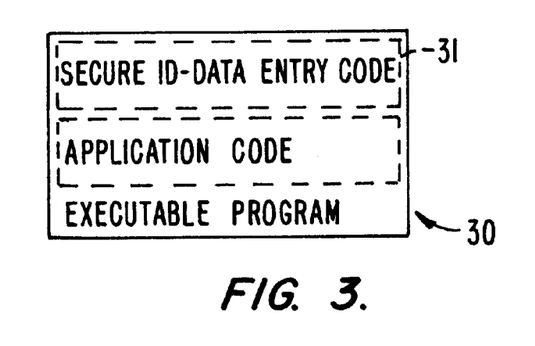
FIG. 3 illustrates application code updated with the preferred embodiment.

In FIG. 3, there is illustrated, in more general terms than FIG. 5, the structure of an application 30 constructed in accordance with the preferred embodiment wherein secure ID-Data entry program code 31 is provided which is extremely difficult to replicate, eavesdrop upon or subvert. The secured ID-Data entry program code 31 can be created, utilising a number of different techniques.

Firstly, the executable portion of the secured ID-Data entry code can be protected against tracing, disassembly, tampering viewing, reverse engineering keyboard entry theft, eavesdropping, hot patching and other attacks by transforming the secured ID-Data entry program code 31 from its normal executable form 16 (FIG. 2) to a corresponding secured form of executable (as hereinbefore described—refer aspects 1 to 4). These techniques are preferably applied to the application code 16 in general or less preferably specifically limited to the ID-Data entry portions 24 thereof.

Additionally, the secure ID-Data entry program code 31 is itself created. This code 31 preferably comprises a complex graphical user interface series of screens and animation designed to make duplication by a rogue thereof extremely difficult.

Initially, the complex user interface should include facilities to disable any frame buffer recording devices, the disablement occurring before each frame is displayed. Also, where a multi-tasking operating system is in use, or where context switching is enabled, switching out of the interface screen is preferably disabled or ID-Data entry procedures encrypted or terminated when the interface screen is swapped out. The images presented which form part of the ID-Data entry screens comprise complex 3D animation sequences having a high degree of complexity and extensive use of screen colours and screen resolution in addition to visual design so as to make copying thereof extremely difficult.

The complex computer graphics can be created utilising standard techniques. For information on how to create complex 3D imagery, reference is made to "Compare Graphics, Principles and Practice" by Foley, Van Dam et al, published 1990 by Addison-Wesley Publishing Company or other standard textbooks on generation of computer graphics. Reference is also made to the numerous internet news groups and archives on graphics and games programming, specifically to: com.graphics.research, com.graphics.rendering, comp.graphics.raytracing, comp.graphics.misc, comp.graphics.digest, comp.graphics animation, comp.graphics.algorithms, comp.graphics, alt-.graphics pixutils, alt.graphics, rec.games.programmer, comp.sys.programmer, comp.sys.ibm.programmer, comp.sys.ibm.pc.programmer, comp.os.msdos.programmer, comp.msdos.programmer, alt.msdos.programmer. Reference is also made to "PC Games Programmers Frequently Asked Questions" document available on the internet, via rec.games.programmer and elsewhere.

By encoding a complex 3D image which forms part of the ID-Data entry screens, the hurdle requirement of a rogue to reverse engineer the complex imagery is substantially increased. The inclusion of graphical animation is advantageous in preventing static screen shot duplication attacks by a rogue form succeeding.

As noted above, it is preferable that traditionally difficult graphical programming techniques are employed wherever possible, with the aim of making it more detectable for a user interacting with the system to discern lesser copies of the animation. Suitable 3D animation can include the introduction of shadows, the lighting of pseudo-3D animated objects, transparent or translucent objects, shing, reflective, or mirrored objects, gravitational effects in animated objects, single-image-random-dot-stereogram bitmaps or backdrops, translucent threads, effects such as diffraction patterns, screen masks, backdrops, colour palette "animation", complex animated objects resistant to simple hidden-surface removal techniques known to those skilled in the art and directed to hindering duplication.

Further, the animation can take into account:

1. Thwarting attempts at compression of the ID-Data entry screens. This can be achieved by having animation which has low visual entropy and having many graphical elements which are altered from frame to frame in a manner which is highly discernible to the human viewer. Apart from being difficult to replicate, complex 3D computer imagery having low entropy or redundancy will require larger amounts of storage space for a rogue attempt at duplication based on recording the screen output and therefore be more readily discernible to the user should this form of attack be mounted.

2. The animation is further preferably designed to thwart a successful replay attach which is based on providing only a subset (limited number of frames) of the screen animation to a viewer. This can be achieved, for example, by the inclusion of several animated spheres which "bounce" around the screen and change colours in a manner that is recognisable to the viewing user but which is not readily repeatable. A replay of only a subset of the screen animations to the viewer will be highly evident in this case when, upon looping the user is alerted to a problem when the animation "skips" or "jumps" and does not operate in a previously smooth manner. This makes it difficult for a rogue spoof program to copy the animation without including all parts of it.

3. Most importantly, the graphics presented can be customised to the input data entered. For example, the information entered by a user can be rendered and/or animated by the secure ID-Data entry program code 31 (FIG. 3). As an example, in an ID-Data entry program, when a user types in their user name, the animation can be created letter by letter. For example, when typing in the user name "CHRIS" each letter could be rendered differently depending on those characters previously typed. For example, the letter "I" might appear as a large "barbers-pole" which spirals and changes colour, speed, size, and/or position and is slightly transparent, thereby allowing the animated seen which is a backdrop to the character to be discerned through the character itself. For example, in the above example, the letter "I" would only appear as the specific animated barbers pole that is does if the previous letters entered were "C", "H", and "R" respectively.

The utilisation of a unique sequence of animation based on a user's input of information sensitive data increases the difficulty of creating any "spoof program" attack on the application 30. This is especially the case since the executable code of application 30 is preferably in an encrypted form. The use of animation being particular to the order in which characters are entered is particularly advantageous as the computational complexity of replication is substantially increased.

A similarly effective animation technique is to produce only one graphical object after entry of each portion of ID-Data, such as a computer-generated human's face, but have the features of said face be determined by a hash or cryptographic function based upon the users input. For example, after entry of the ID-Data "CHRIS" (in this example, the individual characters may not, themselves, be based on the abovementioned generation procedure), a teen-age girl's face with long blonde hair and blue eyes may be displayed. If the "S" was instead a "D", the face would be entirely different. The ID-Data used for producing an object for display should not be ID-Data which is designed not to appear on-screen when entered (eg: a password), since the display of a corresponding object would give a rogue information on which to base guesses of the secret ID-Data.

By utilising cryptography or having complex formulas to determine the sequencing of animation, the rogue programming the corresponding spoof program shall have to crack the cryptographic scheme in order to get the selection of character animation correct for any generalized attack. In the abovementioned example, a rogue will have to determine the algorithm for producing the face, since human beings are adept at recognising faces, and will immediately notice if the face displayed on the screen is incorrect. Such a technique allows for a mathematically secure, visual method to guarantee the authenticity of the software which generates the screen feedback. The user of the software is instructed to note their own particular animation sequence and to immediately discontinuing utilisation of the application 30 should that sequence ever change. The user may also be instructed to contact a trusted person, such as the supplier or operator of the application to confirm that the animation sequence they witness is the authentic sequence intended by said supplier.

Further, the particular animation presented for a particular application 30 can be further customised for each application so as to be distinct (such as by the incorporation of the applications name as part of the animated image).

Further hindrance for a rogue programmer can be created by hand coding portions of the animation in assembly language so as to generate the maximum possible complexity and interaction in the animation with the highest level of detail for individual workstation computers. This further raises a hurdle allowing for the easier detection of rogue spoof programs 22 which will often be written in a more convenient, higher level language (such as C or C++) which will also operate at a different speed, the user being instructed to look for speed differences.

Further, animated scene timing can be utilised, providing anti-looping and frame removal detection is still catered for. The animated scene timing allows for a user to detect unexpected irregularities in a frequently presented animated interface. By including in the animation some deliberate regularity (such as the rhythmic convergence of some parts of the animation in one particular spot), a rogue programming a spoof program shall also have to duplicate the preferably complex timing events necessary to accomplish this convergence. The regular nature of the scene timing should be high enough so that the user expects to see certain events and thereby making it difficult for a rogue spoof program to copy the animation without including all parts of it.

Preferably, where possible, all ID-Data is immediately encrypted which makes recovery of the ID-Data by a rogue through analysis of the computer program memory difficult. Preferably, public-key cryptographic methods (eg: Elliptic-curve, RSA or DIFFIE-HELLMAN cryptography) should be used making it impossible to reverse engineer the cryptographic code to decrypt any sensitive information should it be stolen in its encrypted form. Prohibiting all or most interrupts when data is to be entered and encrypting or hashing the sensitive information immediately so that it is only stored partially, or in an encrypted form, before re-enabling interrupts is one example of achieving this objective.

As a further alternative, analysis of a user's personal characteristics can be included as part of the interface. The can include attempts at recognition of a user's typing style (duration of keypresses, delays between subsequent keys, choice of redundant keys, mouse usage characteristics, etc) or by additional authentication techniques, including smartcards, biometric inputs such as finger prints detectors etc.

Further, the graphical animation routines can be "watermarked" by the secure ID-Data entry program code in that "hidden" information may be incorporated into the scene (for example "salted-checksums") to allow careful analysis of the output of secure ID-Data entry program code 31 to distinguish between original graphics animation and counterfeit animation. For example, the hidden information may be encoded in the least-significant bit of pixel data at selected locations of the animation.

The user determinable sequence of animation can also extend to the provided audio animation. For example, audio and other feedback techniques including music and speaking tones can be played in response to particular key stroke combinations. By utilising different voices and/or tones and/or volumes and pitches for each keystroke or combination, the security of the application 30 can, once again, by substantially increased. The change in voice intonation will be readily "learnt" by a user and thereby further inhibit a rogue's ability to duplicate the same sequence of sounds or voices. Of course, the encoding of the voice system should be in an encrypted form.

Further, upon detecting any attempt to subvert the secure ID-Data entry program code 31 (eg: subsequent to detecting tampering), a notification message is preferably sent to a prosecuting body or the like where the application 30 is currently, or later becomes connected to a network such as the Internet, or by other means (eg: via Modem or by including coded information in public or other files).

For application programs 30 requiring activation by a host program executed on a different computer, a secure means of activation can be incorporated into the client application 30. The host and client intercommunication can issue challenge and response code authentication and verification utilising cryptographic systems such as public-key encryption and/or other standard means of overcoming data replay attacks and other threats designed to trick the secure client application 30 into activation.

It would be appreciated by a person skilled in the art that the process of coding any data entry process utilising these techniques, together with additional techniques to protect against recording, and eavesdropping, and executable protection techniques may be necessary to improve the security of the interface. Additionally, executable encryption, additional authentication, and other methods are desirable in producing the protected executable.

SUMMARY OF THE APPLICATOR (of an Improved Process of Security as Hereinbefore Described)

A preferred embodiment of the present inventions' method (hereinbefore described as the "applicator") by which to apply an improved process of security (as hereinbefore described) will now be described with reference to the accompanying drawings.

Figure 7:
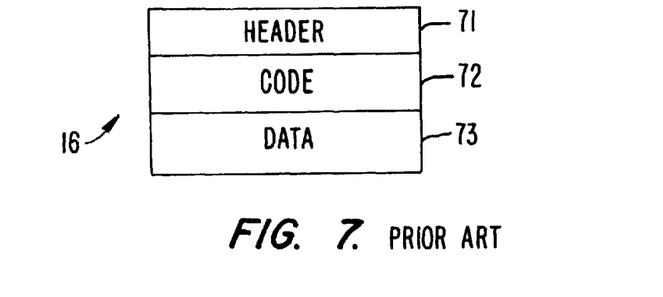
FIG. 7 illustrates a standard layout for a program to be executed on a computer system.

Referring now to FIG. 7, there is shown a standard format utilised for storing executables on disk, often occurring in the art, and in particular in conjunction with programs run on the above mentioned operating systems. The standard executable 16 normally comprises a header section 71, a code section 72, and a data section 73. The header section 72 normally stores a standard set of information required by the computer operating system 17 (FIG. 1) for running of the executable 16. This can include relocation data, code size etc. The code section 72 is normally provided for storing the "algorithmic" portion of the code. The data section 73 normally is utilised to store the data, such as constants, or overlays 92 utilised by the code section 72.

Figure 6:
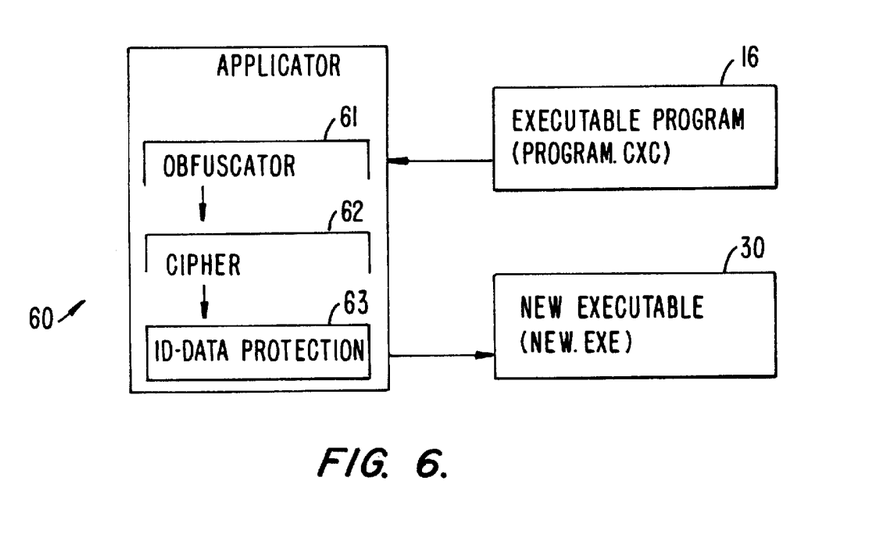
FIG. 6 illustrates the general structure of the preferred embodiment of the applicator.

Turning now to FIG. 6, the preferred embodiment of an applicator program 60 is shown which takes as its input the executable program 16 and performs an obfuscating step 61, a ciphering step 62 and an anti-key press and authentication step 63 (described hereafter) which perform various transformations on the executable program 16 to produce a new executable program 30.

The obfuscating step 61 modifies the header 71 (FIG. 7) of the executable 16 in addition to inserting loading code which will be described hereinafter. The cipher step 62 encrypts the existing executable 16 and calculates check data (eg: a checksum) for the encrypted executable. The anti-key press and authentication step 63 replaces various insecure system calls with safe equivalent code and preferably inserts code to graphically represent the integrity of said executable program.

The newly formed executable 30 (new.exe) can be then stored on disk and the applicator program 60 completed, the new executable 30 replacing the old executable program 16.

When it is desired to run the replacement executable program 30, the replaced executable (new.exe) executes the obfuscating code, previously inserted by applicator 60. The obfuscating code initially decrypts the executable program and validates the stored check-data before re-executing the decrypted executable.

The foregoing description of the preferred embodiment has been in general terms and it will be understood by those skilled in the art that the invention has general application to many different operating systems, including MS (Microsoft) DOS (Disk Operating System), APPLE MACINTOSH OS (Operating System), OS/2 (OPERATING SYSTEM 2), UNIX, etc.

The most common operating system utilised today is the MS-DOS (Microsoft Disk Operating System) operating system. This operating system is designed to run on INTEL x86 microprocessors and includes a large number of historical "quirks" which give use to greater complexity than would perhaps be otherwise required when designing a new operating system from "search". For illustrative purposes, there will now be presented a specific embodiment of the preferred embodiment designed to operate under the MS-DOS operating system. Unfortunately, the example is quite complex as it operates in the framework of the MS-DOS operating system. Therefore, it is assumed that the reader is familiar with systems programming under the MS-DOS operating system. For an extensive explanation of the inner workings of the MS-DOS operating system, reference is made to standard texts in this field. For example, reference is made to "PC Intern" by Michael Tischer, published in 1994 by Abacus, 5370 52nd Street, S.E. Grand Rapids, Mich. 49512. A second useful text in this matter is "PC Architecture and Assembly Language" by Barry Cauler, published 1993 by Carda Prints, 22 Regatta Drive, Edgewater, Wash. 6027, Australia.

The specific embodiment of the present invention will be described with reference to altering an "EXE" executable program under DOS in accordance with the principles of the present invention.

Figure 9:
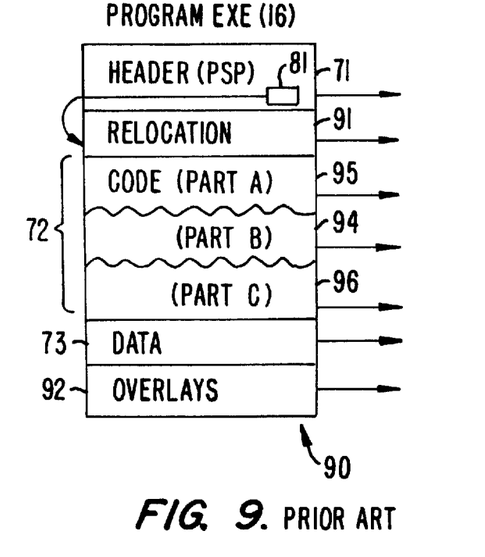
FIG. 9 illustrates a standard layout of an EXE program under MS-DOS.

Referring now to FIG. 9, there is shown the structure 90 of an executable "EXE" program in MOS-DOS as normally stored on disk. This structure is closely related to the structure 16 of FIG. 7 which illustrates the more general case. The structure 90 includes a header 71, otherwise known in MS-DOS terminology as the program segment prefix (PSP). This is normally followed by a relocation table 91 which contains a list of pointers to variables within a code area 72 which must be updated with an offset address when the program is loaded into a particular area of memory. The operation of the relocation table is well known to those skilled in the art of systems programming. The next portion of structure 90 is the code area 72 which contains the machine instructions for operation on the x86 microprocessor. This is followed by a program data area 73 which contains the data for code area 72. Finally, there may exist a number of overlays 92 which contain code which can be utilised in a known manner.

Figure 8:
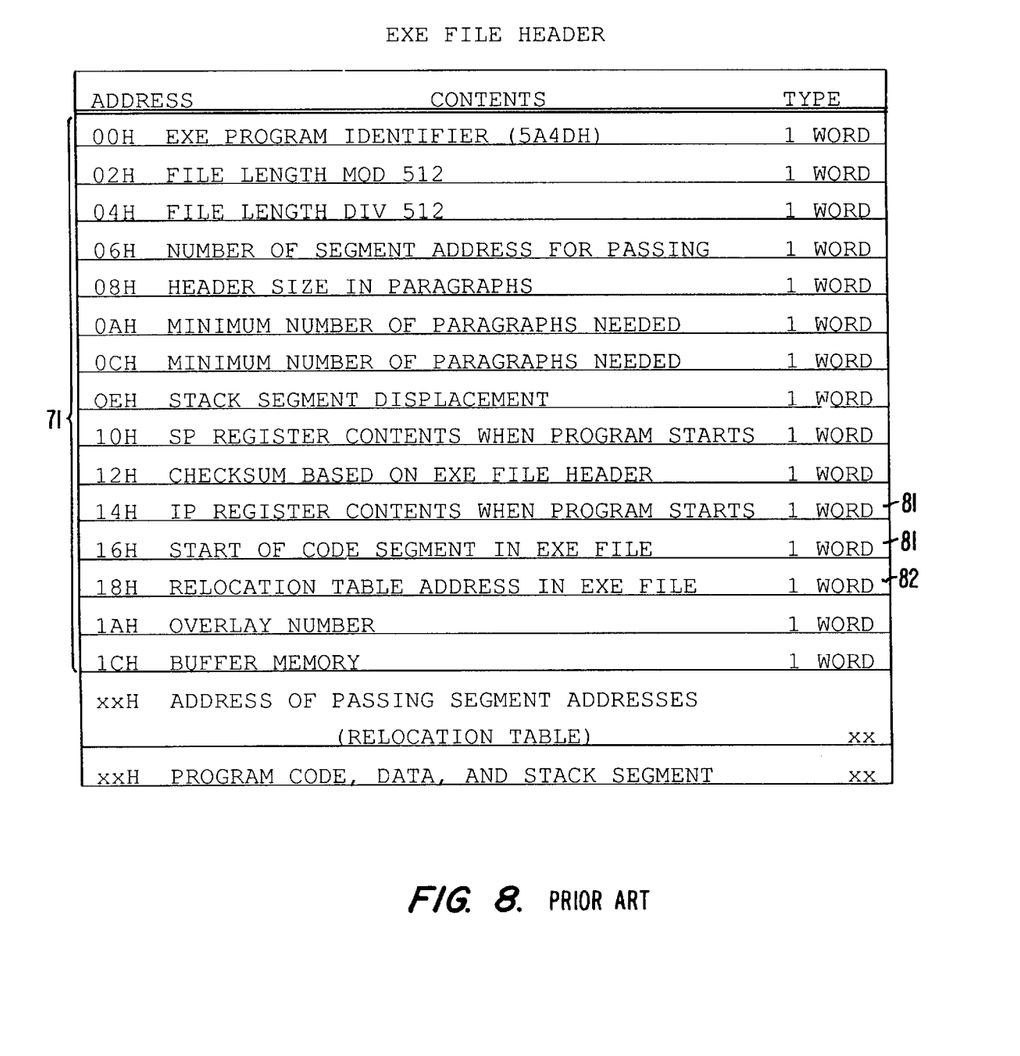
FIG. 8 illustrates the standard layout of an EXE header under the MS-DOS operating system.

Referring now to FIG. 8, there is shown the structure of EXE file header 71 in more detail. The table of FIG. 8 being reproduced from page 750 of the above mentioned Tischer reference. It should be noted that the header 71 includes a number of fields including, for example, a pointer 81 to the start of the code 72 (FIG. 7) and a pointer 82 to the relocation table 91 (FIG. 9).

In the specific embodiment, the applicator program 60 (FIG. 6) proceeds by means of the following steps:

(1) The executable program 16 is opened for reading and a determination made of its size.

Figure 10:
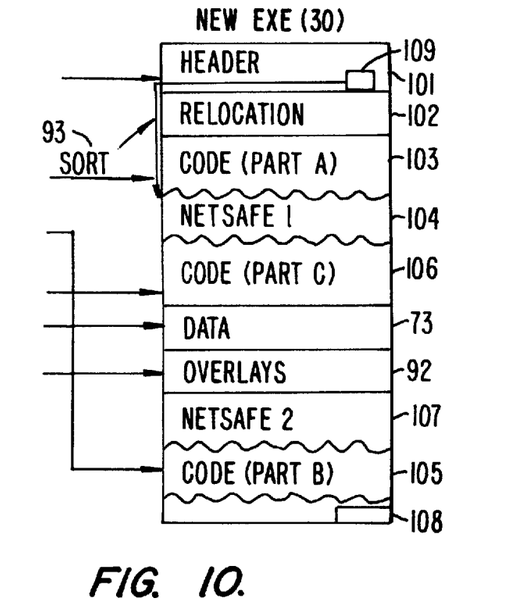
FIG. 10 illustrates an altered executable form constructed in accordance with the specific embodiment.

(2) The header 71 (FIG. 9) of executable program 16 is then read in and a copy is stored within applicator program 60. A copy of the header 71 is written out to form part 101 of the new.exe file 30 as illustrated in FIG. 10.

(3) Next, from the fields 81, 82 of the header 71 (FIG. 8) a determination is made of the size of relocation table 91 of executable program 16.

(4) Next, determination is made of the size of the executable code 72 and data portions 73.

(5) The relocation table 91 is then read into the memory of the applicator program 60. As noted previously, the relocation table 91 consists of a series of the pointers to positions within code segment 72 which are required to be updated when loading the program exe file into memory for execution. The relocation table is sorted 93 by address before being written out to the new.exe executable file at position 102.

(6) As noted previously, the relocation table 91 consists of a series of pointers into code area 72. A determination is made of the size of a code, known as the "netsafe 1" code 104, the contents of this code will be described hereinafter. Next, a search is conducted of the sorted relocation table 102 to find an area between two consecutive pointers within code section 72 which is of greater magnitude than the size of netsafe 1 code 104. This area 94, designated part B in FIG. 9 is located. If this code portioned 94 cannot be located the applicator program 60 exists with an error condition.

Upon finding code portion 94, the code portion 95, also denoted part A is encrypted and copied across to form new code portion 103. Code portion 94 is then encrypted and copied to an area 105 of new.exe 30. The netsafe 1 code 104 is then inserted by applicator 60. Code portion 96, also denoted part C is encrypted and copied across to form code portion 106. Data portion 73 and overlay portion 92 are copied into new.exe 30 as shown. A second portion of obfuscating code, denoted "netsafe 2" 107, the contents of which will be described hereinafter, is then inserted after overlays 92 and before code portion part B 105.

(7) The header 101 is then updated to reflect the altered layout of new.exe executable 30. Additionally, the initial address 109 of execution stored in header 101 is altered to be the start of netsafe 1 portion 104.

(8) As mentioned before, code portions 103, 106 and 105 are subject to encryption or encipherment in accordance with step 62 of FIG. 6. The encryption scheme utilised can be subjected to substantial variation. In this embodiment, the DES standard encryption scheme was utilised. This scheme relies on a fifty-six bit key for encryption and decryption and is well known in the art.

Once encrypted, it is necessary to store the decryption key in new exe executable 30. A number of different methods can be utilised to store the key. The preferred method is to spread portions of the key to different positions within the executable 30. For example, bits of the key can be stored within the netsafe 1 code 104 and netsafe 2 code 107. Additionally, bits of the key can be stored within header portion 101. Also, it is envisaged that bits of the key can be stored in the condition codes which are a consequence of execution of various instructions within netsafe 1 area 104 and netsafe 2 area 107 and/or the operating system 17 (FIG. 5), with the overall requirement being that the key can be later extracted using a predetermined algorithm.

(9) The next step is to patch the address of the start of code area 72 and netsafe 2 code area 107 into the required locations within netsafe 1 area 104.

The netsafe 1 area is then written to the file containing new.exe executable 30.

(10) The area 106 is then encrypted as aforementioned and written to the executable 30 followed by overlays 92 and encrypted netsafe 2 code portion 107.

(11) As will become apparent hereinafter, upon execution of new.exe executable 30, netsafe 2, area 107 is responsible for loading code portion 105 over the top of netsafe 1 area 104. Therefore, it is necessary to write the relevant addresses of the start and end of code portion 94 to the required position within netsafe 2 area 107.

(12) As will be described hereinafter, netsafe 2 area 107 is also responsible for decrypting the encrypted portions of codes 103, 104, 105, 106, and 107 and hence the netsafe 2 area 107 must also store this combined code size for later use on decryption.

Finally, a overall checksum for new.exe 30 is calculated and stored at the end of the file at position 108. This checksum is later used to verify the decryption procedures' success and to prevent the execution of "scrambled" code, which would be the result if new.exe 30 were tampered with.

As will be further described hereinafter, netsafe code areas 104 and 107 contain code to decrypt the encrypted areas of the new.exe 30, to repatch code portion 105 back to its original position, and to replace potentially insecure routines or easily spoofed screens normally utilised by the application (eg: unsafe keyboard drivers) with an alternative safe form of routine.

Upon execution of the new.exe executable 30, the executable starts at the start of netsafe 1, area 104 (FIG. 11), as thus address has been previously patched into position 109 (FIG. 10) of header 101 (FIG. 10). The netsafe 1 area 104 then performs the following steps (A1) to (A10).

(A1) The first step is to disable all the interrupts apart from those necessary for continued operation of the computer device 18 (FIG. 1) (for example, memory refresh cannot be disabled). The disabling of interrupts includes the disabling of the keyboard interrupt in order to stop amateur "code snoopers" from determining the operation of the code area 104.

(A2) The next step is to interrogate the calling environment of the operating system stack to ensure that the program new.exe was not called by a debugging program which is tracing the operation of new.exe. Additionally, the data variables necessary for operation of netsafe 1 code area 104 are defined to be on the operating system stack (Refer Address OEH and 10H in FIG. 8). This stack will change unexpectedly when in a code snooping or debugging environment and will cause the debugger to crash, thereby stopping a it from following the operation of new.exe executable 30.

(A4) The interrupt trap addresses are then altered in a two stage process. The first stage resets a first part of the SEG-OFF address format and occurs at this point with a second stage occurring at a later time as well be further described herein below. By staging the alteration of interrupt trap addresses, any code snooper will be further confused as said trap addresses will initially be garbage.

(A5) Any input from the keyboard is further disabled by informing the MS-DOS operating system to ignore any received keys.

(A6) The second stage of the revectoring of the normal debugging interrupts is then applied so that the normal debugging interrupts can be used by the decryption code, to be described hereinafter, thereby making debugging almost impossible.

(A7) A check is then made to ensure that the above processes have been successful in that the debugger interrupts do not point to any debuggers, the keyboard is still disabled and the operating system has disabled the acceptance of keys from the keyboard.

(A8) The key for decryption is then reconstructed utilising the reverse process to that utilised in storing the information located in the key.

Figure 11:
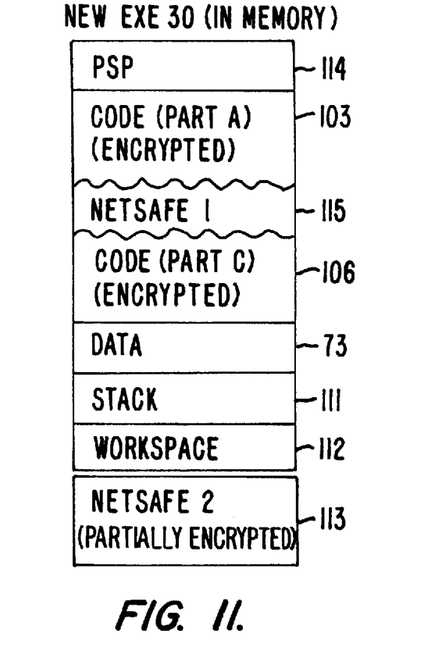
FIG. 11 illustrates a first stage of execution of the new.exe executable.

(A9) Turning now to FIG. 11, there is shown the standard format of the executable new.exe 30 when executing in memory. As will be well known to those skilled in the art, an executing program under the MS-DOS system will include a stack 111 and work space 112. A memory allocation (Malloc) call is then done to set aside an area 113 for the loading in of the netsafe 2 code 107 of FIG. 10. The disk copy of new.exe 30 (having the format shown in FIG. 10) is then opened by the netsafe 1 code 115 and an encrypted copy of netsafe 2 code 107 (FIG. 10) is then loaded in from the disk file, decrypted and stored in memory area 113. The relocatable pointers of the code contained within the netsafe 2 code 113 are then updated to reflect the position of the executable in memory.

(A10) Control is then passed to netsafe 2 code 113.

The code area netsafe 2, 113 then performs the following steps (B1) to (B4):

(B1) The portion of code of the disk copy denoted part B, 105 (FIG. 10) is read in from disk in an encrypted format and written over the old netsafe 1 code 115.

(B2) As will be further described hereinafter, the netsafe 2 area 113 includes a number of keyboard routines which are preferably stored in an encrypted format. Therefore, the next step is to apply the decryption to any of the encrypted areas of netsafe 2 code area 113. After decryption, the netsafe 2 area 113 is checksummed and the result is tested against a prestored checksum to ensure the integrity of netsafe 2 area 113.

(B3) The disk copy of the new.exe is then again read in and checked against prestored check data to ensure that it has not been changed. Additionally, an attempt is made to read past the end of file of the disk copy of new.exe 30 (FIG. 10) to ensure that no extension (eg: viral) has occurred.

(B4) The encrypted portions of the memory copy (FIG. 11) of new.exe are then decrypted utilising the key and once decrypted, the decrypted portions are again checked and tested against predetermined data.

Figure 12:
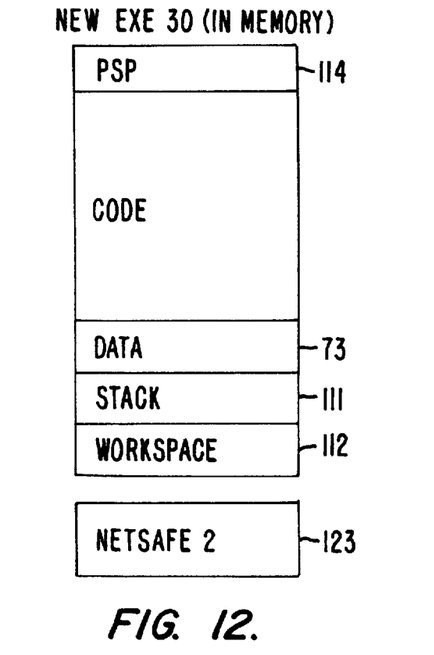
FIG. 12 illustrates a second stage of execution of the new.exe executable file; and, FIG. 13 illustrates a third stage of execution of the new.exe executable file.

The next step in execution of the netsafe 2 code 113, is to replace insecure (eg: keyboard) system routines with a more secure method. Referring now to FIG. 12, there is shown the current state of the new.exe executable in memory. The insertion of the more secure system routines then proceeds in accordance with the following steps (C1) to (C5):

(C1) Firstly, a second memory allocation is done to set aside an area 51 (FIG. 13) for the storing of the secure hardware routines (eg: keyboard). These routines are then copied from their area within netsafe 2 code 113 to the memory area 51.

Figure 13:
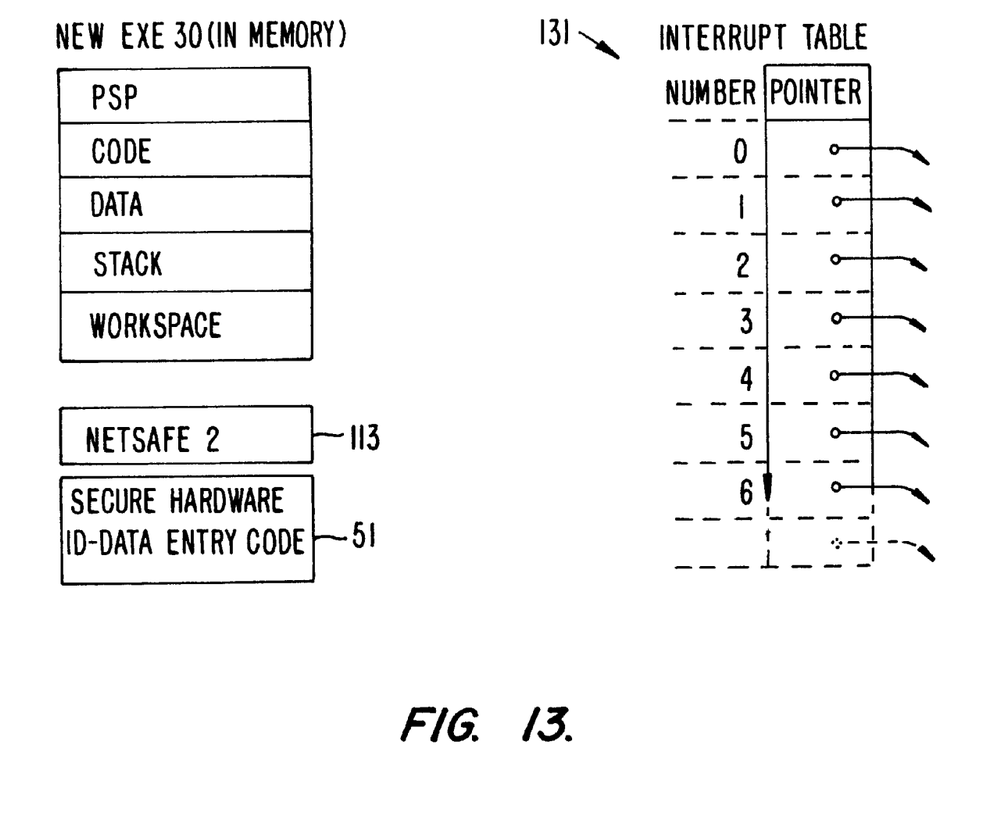

(C2) Next, the ID Data entry routines which are normally activated by the interrupt table 131 when dealing with ID-Data input are altered such that, rather than pointing to corresponding areas of the MS DOS operating system 17, they point to the corresponding secure area 51. These interrupts include interrupt 9 which occurs when a key is pressed on a keyboard, interrupt 29$h$ which read a key and interrupt 16$h$ which tests for the presence of a key.

(C3) The executable 30 (FIG. 13) is then ready for execution and the registers are initialised, the memory area 113 deallocated & control passes to the original start address of executable program 16.

(C4) It will be evident, that when executing, all keyboard calls (or other ID-Data entry calls, if other than keyboard) will be passed to keyboard (or other) routines 51 with the keyboard hardware being interrogated directly by keyboard routines 51 to return information to the calling program. Keyboard routines 51 include a copy of the correct interrupt vector addresses for each keyboard routine and each time they are called, a check is made of the interrupt table to ensure that it has not been altered. Preferably, keyboard routines 51 protect the keyboard hardware by issuing controller reset or similar commands to flush the keyboard data out of the circuitry after said data is retrieved to prevent hardware eavesdropping or routines 51 utilise the protected mechanisms of the central processor to protect said hardware from eavesdropping.

(C5) When the executable 30 terminates, interrupt 21$h$ (an MS-DOS standard) is called. This interrupt is also revectored to a corresponding area of routines 51. The termination code of keyboard routine area 51 restores the correct interrupt pointers in interrupt table 131 to point to the MS-DOS operating system 17, and clears the no-longer-needed program and data from memory before returning to the DOS operating system by calling the real interrupt 21.

The foregoing describes only on particular embodiment of the present invention particularly to the operation of the MS-DOS operations system. It will be evident to those skilled in the art, that the principles outlined in the particular embodiment can be equally applied to other operating systems in accordance with the objects of the present invention. Further, combinations, variations and/or modifications, obvious to those skilled in the art, can be made to the present invention. All such combinations, variations and/or modifications should be considered to fall within the scope of the invention as broadly hereinbefore described and as hereinafter claimed.

I claim:

1. A computer system having software having input routines with enhanced security features for entry of ID-Data comprising:

a processor; and a memory, wherein said software stored in said memory when executed by said processor comprises:

anti-spy techniques within said input routines which prevent or hamper eavesdropping;

detect tampering of said software which, upon detection of tampering, either disallow the subsequent entry of ID-Data into said input routines, or which invalidate said ID-Data in order to disallow current and subsequent access to that which said ID-Data would have otherwise allowed; and further comprising at least one of the following code contained in said software:

code to automatically scan memory of said software one or more times before or during execution of said software to detect tampering;

code to store or communicate details of detected tampering for later examination, said details including all or part of said tampered software, or other information available to said tampered software from said computer system; and code to prevent, or detect and subsequently prevent tracing, or misleading code debuggers and the execution of tracing by utilizing debugger trap facilities for the normal operation of said security-enhanced software, or monitoring system timers or timing-sensitive instructions or monitoring CPU stack contents or monitoring system buffers to detect the activity of code debuggers, or disabling facilities such as, the keyboard, serial ports, printer ports, mouse, screen or system interrupts in order to hamper code debuggers, or testing that the disabled status is still true of said facilities to detect code debuggers, or utilizing system interrupts which would ordinarily be used by code debuggers for the custom purposes of said security-enhanced software, or utilizing CPU instruction caches together with self-modifying code to mislead code debuggers, or scanning or interrogating the operating system or executable-load-process to detect code debugger instructions or environments, characterized in that the program optionally includes a process or multiple processes which are resident or child processes of said security-enhanced software which execute during system interrupts of after the parent process has terminated in order to hamper tracing.

2. A method of altering an original executable program to form an altered executable program having increased security, said method comprising the steps of:

(a) inserting obfuscating code into a first number of predetermined areas of said executable program; and, (b) encrypting portions of said executable program for later decryption upon execution; such that, upon execution of said altered executable program, said execution includes the steps of;

(c) decrypting the altered executable program; and (d) restoring said altered executable program to said original executable program.

3. A method as claimed in claim 2 further comprising one or more of the following:

said obfuscating code include replacement codes for insecure system routines and said method further includes the step of (e) replacing the execution of said insecure system routines with said replacement codes;

said steps (c) and (d) occur while simultaneously substantially disabling eavesdropping on the operation of said steps (c) and (d) by any rogue program;

said step (a) includes inserting a portion of said obfuscating code into the code area of said original executable program; and, said step (e) includes altering portions of an interrupt vector table to point to said replacement codes;

said step (b) includes the storing of a decryption key in a plurality of predetermined areas of said altered executable program, said predetermined areas include the condition codes of predetermined instructions of said altered executable program.

4. A method of providing for a secure entry of ID data or input information in a computer system comprising:

a. activating a visual display or animation or audio feedback (hereinafter called an audiovisual component) as part of said secure entry of said ID data or said input information so as to substantially hamper cumulation of a secure entry process; and b. audio/visual component feedback comprising at least two of:

i) at least part of said input information;

ii) at least part of information based upon some transformation of at least part of the software comprising said audio or visual component or the computer operating system upon which said audio or visual component operates.

5. A method as claimed in claim 4 wherein said audiovisual component has repeatable characteristics during subsequent invocations of said entry process, such that said audiovisual component on each invocation of said entry process has a predetermined resemblance to the audiovisual component of all other invocations of said entry process, or, said audiovisual component is varied in accordance with the information entered.

6. A method as claimed in claim 4 wherein said audiovisual component comprises moving parts and/or includes 2,5-dimensional animation or 3-dimensional animation, and/or, said audiovisual component includes a representation of said input information, preferably comprising (a) display of a single graphical object, and/or (b) production of a single audio-feedback sequence, after the entry of all or part of said input information.

7. A method as claimed in claim 6 wherein said input information representation includes animation of input characters and/or audible or other feedback determined by input characters, wherein the representation of said input characters may optionally vary for each character based on the result of a predetermined transformation of the preceding inputted characters, wherein said transformation utilises cryptographic or hashing methods.

8. A method as claimed in claim 6 wherein: the ease by which faithful replication of said audiovisual component is substantially reduced by inclusion in said audiovisual component the techniques of on screen shadow rendering and/or spot or flood scene fighting effects and/or scene or object shading and/or transparent or translucent objects and/or shiny, reflective, or mirrored objects and/or real-time animation roughly obeying real world gravitational effects and/or single-image-random-dot stereogram bitmaps or backdrops and/or partial scene masking effects and/or full or partial scene distortion or diffraction effects and/or animated objects designed to resist simple hidden-surface removal techniques and/or animated bitmaps and/or audible echo effects and/or differing audio voice effects and/or differing audio volume and/or differing audio tones or pitches; wherein, said audiovisual component is optionally immediately recognisable to human beings and includes information which identifies to the user the application to which said audiovisual component belongs; wherein, the ease by which faithful replication of said audiovisual component may optionally be further reduced by inclusion in said audiovisual components animation object movement timing such that at near regular and frequent intervals regularities occur which are obviously recognisable to users of said entry process; and preferably, wherein, said entry process including said audiovisual component utilises a substantial portion of the computational resources of said computer system; and, wherein, said entry process code responsible for said audiovisual component is coded in the assembly language of the computer system preferably wherein recording said audiovisual component by said computer system is disabled.

9. A method as claimed in claim 4 wherein (a) the facility to suspend or swap-out said entry process is either disabled, or, (b) immediately upon suspension request, said entry process is protected against subsequent examination by encryption or by termination and removal from memory or said entry process, or, (c) where the facility to allow the central processor or processors of said computer system to execute code other than the code of, or the code necessary for said entry process is either disabled or else said entry process is protected against examination.

10. A method as claimed in claim 4 wherein: said entry process hampers simple recording by utilising the maximum practicable use of audiovisual framerate, and/or audiovisual resolution, and/or screen colours; and/or, audiovisual design in said audiovisual component on said computer system, and/or said entry process hampers the compression of recorded output from said audiovisual component by utilising high audiovisual entropy and/or by the inclusion of random or other noise in said audiovisual component; wherein, said audiovisual component preferably includes continuous output such that the looping of only a subset of said output shall not reproduce a copy largely indistinguishable to said audiovisual component.

11. A method as claimed in claim 4 wherein said ID-Data or said input information is encrypted by a cryptographic process or hashed immediately upon entry and a plain text equivalent is not stored by said computer system; and/or, wherein disablement of one or more interrupt instructions (or equivalent CPU devices) is utilised to protect said cryptographic or said hash process of said ID-Data to hamper the recovery of said ID-Data by processes other than said entry process.

12. A method as claimed in claim 4 wherein said input routines or said secure entry process prevents the re-vectoring of system interrupts in order to protect said ID-Data or said input information form being stolen, by means of re-applying interrupt vector pointers one or more times and/or by means of examining interrupt assignments in order to perform a predetermine d function should the expected assignments be altered.

13. A method as claimed in claim 4 wherein in order to further authenticate and/or identify said user, additional aspects of said ID-Data or said input information are used including the duration of individual key presses and/or mouse button presses and/or the delay between subsequent individual key presses or mouse button presses and/or the user's selection of particular keys when more than one equivalent exists and/or the acceleration or velocity characteristics of mouse usage and/or where said input information includes information from other sources including biometric and/or smartcard information.

14. A method as claimed in claim 4 wherein said input routines or said secure entry process authenticates itself using (a) executable code checksums of RAM or other images of its own executable code and/or data, (b) and/or comparison of memory with other stored copies of said executable code, (c) and/or decryption of said entry process (d) and/or detection of executable tampering by examination of the executable's environment (e) and/or comparison of executable size with expected values (f) and/or by attempting to read past the end of the executable file to determine that the size is correct; parts (a) through (f) occurring either upon initial load or during or after execution one or more times or continually during execution.

15. A method as claimed in claim 4 wherein said input routines or said secure entry process:

makes use of system interrupts to monitor itself in order to detect alternation of itself;

incorporates means by which to notify and/or transmit authentication failure details to a third person or process should said self authentication fail, records a log of the usage and/or details of the user of said input routines or said secure entry process;

incorporates warning s within the executable image indicating that examination and/or tampering is prohibited;

stores loading and/or decryption routines are stored within the executable image in such a way as they initially replace other entry process routines and upon successful decryption and/or authentication, said other entry process routines are replaced;

hampers executable-code tracing through control-flow changes in debug environments or through disabling one or more system interrupts and/or disabling the keyboard and/or disabling the mouse or other input devices and/or making use of the program stack pointer to discern existence of a debug environment and/or utilising debug interrupts for program code operation and/or self-modification of executable code and/or examination of CPU flag registers and/or verification of disabled interrupts still-disabled state and/or verification of disabled keyboards still-disabled state and/or loading additional executable code into memory during execution;

includes obfuscating assembly language dummy operation codes or instruction prefixes inserted after one or more unconditional branches to hamper executable disassembly and/or decompilation and/or reverse engineering;

becomes securely activated by its activation process and/ or a host or server computer using a challenge/response activation protocol or using public or private key cryptographic methods; and/or becomes stored outside of said computer system memory in encrypted form and/or where said entry process employs techniques to hinder executable-code tracing and/or executable-code disassembly or disclosure or decompilation and/or executable-code tampering and/ or executable-code hot-patching and/or reverse-engineering and/or pre, in, or post-execution executable-code recording, copying, eavesdropping or retrieval and/or theft of said input information from keyboard hardware or software or drivers.

16. A method as claimed in claim 4 wherein said audiovisual component contains watermark information incorporated into the scene to allow close inspection of said audiovisual component to distinguish between the genuine process and a close replica.

17. A computer program product for requiring the entry of ID-data for access thereto, said program characterized by having an enhanced security structure or features to prevent ID-data eavesdropping or theft or to ensure authenticity, having:

a computer readable storage medium for holding codes; and further comprising one or more of the following:

code for preventing ID-data eavesdropping, by communicating directly with input hardware of a computer;

code for preventing disassembly thereof, said code for preventing disassembly comprising obfuscating inserts, dummy instructions or executable encryption;

code for preventing tampering therewith, said code to prevent tampering comprising:

code for reading its own image including external or internal memory images or calculating check data associated therewith; and code for comparing said read image or calculated check-data with an authentic image or check-data to prevent execution-tracing, and code for disabling interrupts or for performing timing-sensitive instructions between interrupts; or, code for ensuring authenticity, by providing an audio or video feedback to an output device to be viewed or heard by an operator.

18. A method for enhancing the security of access to user identification data by software on a computer system comprising:

using an obfuscating process to hamper or prevent eavesdropping;

detecting tampering; and if tampering is detected, selecting an action of either disallowing subsequent entry of the user identification data into input routines or invalidating the user identification data in order to disallow current and subsequent access to the user identification data.

19. The method of claim 18, wherein program code that is vulnerable to eavesdropping is replaced with equivalent program code wherein said vulnerability is removed, and wherein said equivalent program code communicates directly with the hardware of the computer while disabling functions that would permit rogue software to eavesdrop.

20. The method of claim 18, further comprising using encrypting or inserting dummy instructions in said user identification data to hamper or prevent eavesdropping.

21. The method of claim 18, wherein detecting tampering includes code that re-reads the code's own external-image or the code's internal memory image and compares a calculated checksum of said image with a pre-calculated checksum.

* * * * *